Aug. 15, 1939.  C. L. RUHL  2,169,292
COMPOSITE TRAY AND RACK
Filed Feb. 4, 1937  3 Sheets-Sheet 1

INVENTOR
Charles L. Ruhl

Aug. 15, 1939.   C. L. RUHL   2,169,292
COMPOSITE TRAY AND RACK
Filed Feb. 4, 1937   3 Sheets-Sheet 3
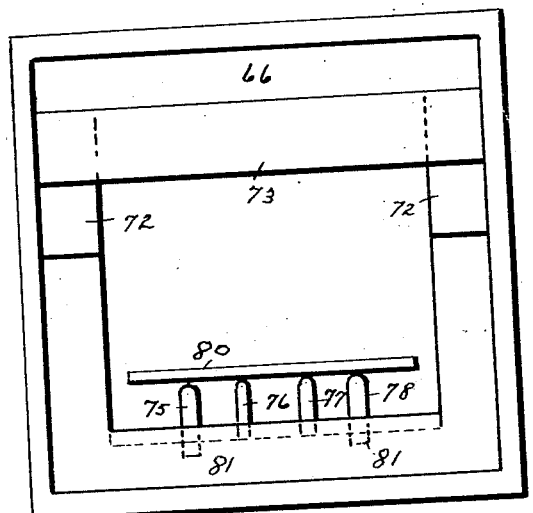
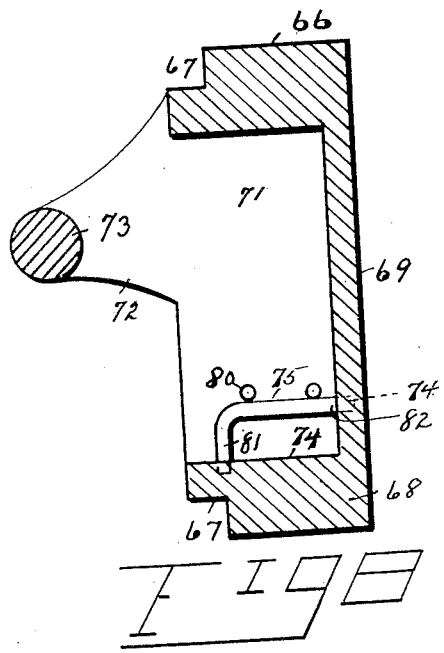
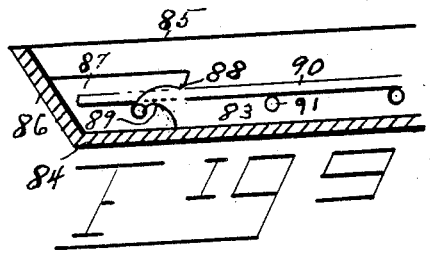
INVENTOR
Charles L. Ruhl Patented Aug. 15, 1939

2,169,292

UNITED STATES PATENT OFFICE 2,169,292

COMPOSITE TRAY AND RACK

Charles L. Ruhl, Dallas, Tex.

Application February 4, 1937, Serial No. 124,059

3 Claims. (Cl. 45—28)

This invention relates to a composite tray and rack, each of which is interdependent, one upon the other, for completeness as a unit, and wherein and whereby the rack will flexibly co-operate with the tray to support items placed thereon, and independently of the tray, while at the same time, permitting the rack to be supported in connection with and by the tray in such a manner that the rack will not cant with respect to the tray.

In connection with the conception herewith, it is an object of the invention to so resiliently and yieldingly develop a rack, that its relation, with reference to the tray will be that of impingement against the tray to prevent the rack from accidentally separating from the tray.

It is also an object of the invention, to so form the rack as to permit it to both rest on the bottom of the tray, and also have certain parts thereof in forced impingement contact with retainers associated with the tray, and also to form the rack of a continuous strand of material so as to develop in the formation a sufficient resistance to permit its resistance as well as resilience to maintain the rack in place without allowing canting of the rack.

It is also an object of the invention, to provide for the retention of the rack in place in the tray, when soap placed upon the rack is adhered to the elements of the rack so that the soap may be pulled away from the rack without removing the rack from the tray.

Obvious additional objects of the invention, clearly seen, will appear in sequence from a further and complete reading of the following specification.

On the sheets of drawings, accompanying and forming a part of this specification, Figure 1 illustrates a plan view of a tray and a fabricated rack unit occupying an impingement relation thereto.

Figure 7 is an elevation view of an insert-tray with insertable and impingable rack.

Figure 8 is a side section in elevation of the same, and

Figure 9 is a detail view in elevation and in section showing a modified form of invention, wherein a rack is maintained in place by an interlocking element.

In these several views, similar characters of reference will indicate similar parts.

Preparatory to a deliniation of the invention, and to a more thorough understanding of the design of the same, the forcing into place and the holding by impingement a rack in association with a tray is the primary essential of the invention, and in certain instances this impingement is developed by alignment flexation of certain parts of the rack. With this in view, the following will suffice for an explanation of the invention.

Figure 1:
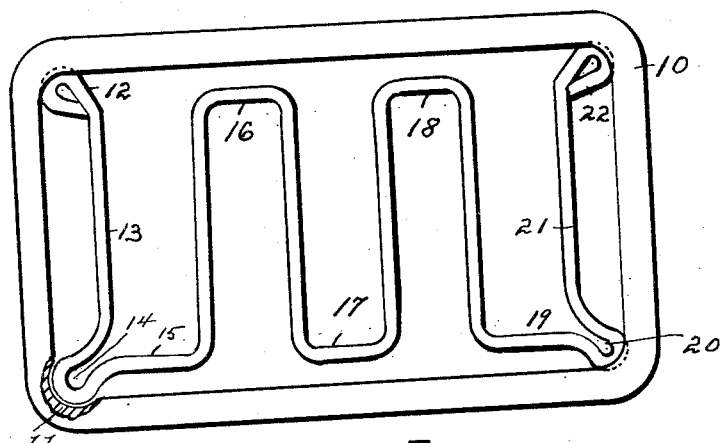

In Figure 1, a tray 10 is shown as rectangularly formed, and, in the region of each corner thereof is formed a retainer 11, which, preferably in the present instance is depressed beyond the inner wall of the tray. This tray, may be made of any suitable material, and especially of flexible material, so as to impart perfect impingement as may now be seen.

The rack for this tray is formed on a strand of material initially bent upon itself to form a loop 12 for residence in one of the retainers 11, and from this loop the strand converts into a pressure bar 13 adapted to permit the finger pressure to be appropriated in the flexation of the rack, as will be observed. From this finger-pressure bar, the strand converts into a bight 14 again for residence in one of the retainers 11, and from thence a lateral extension 15 extends to a U-shaped formation 16 of which, in the present instance there are three—17 and 18, the bights whereof alternate positionally, and from the latter one proceeds again laterally a bar 19, terminating in a bight 20 for residence in one of the retainers 11, and from this bight extends a finger-pressure bar 21 which terminates in a loop 22 similar to 12 and also adapted to reside in one of the retainers 11. As a consequence of the aforesaid rack construction, the inherent resilience developed therein, due to the formation thereof, will create such resistance, when the loops 12 and 22 and the bights 14 and 20 are in their seated positions in the retainers 11, as to develop a frictional impingement between these elements and consequently insure retention of the rack in the tray even against the pull of any item that may stick to the bars of the rack.

By reference to Figures 2 and 3, the tray 23 will constitute a part of a structure including a back 24 below which and in the wall of the tray proper are openings 25 and 26' receding into the back wall of the tray.

A strand is bent upon itself as shown, to form alternating bights 26, 27 and 28, and from these proceed lateral arms or bars 29 and 30 which are depressed or offset from the alignment of these bights rests 31 and 32 for the purpose of elevating the rack from the base of the tray 23 and holding the same in axial alignment with the holes or openings aforementioned.

In the normal formation of this rack, there extends from the lateral bars 29 and 30, two finger-pressure bars 33 and 34, adapted to be disposed substantially parallel with the side walls of the tray 23, and these turn in to bars 35 and 36 and again extend away from the formation to form tines 37 and 38 which, in the normal position of the formation, will have their axis disaligned from the axis of the openings 25 and 26, so that, in order to effect an insertion of these tines into the openings, the structure through the finger-pressure bars 33 and 34 must be gained by flexing the structure until that alignment is found when insertion may not only be had, but that when the pressure is released, the tines will impinge the wall of the openings and frictionally hold the tines in place against these opening walls.

Figure 2:
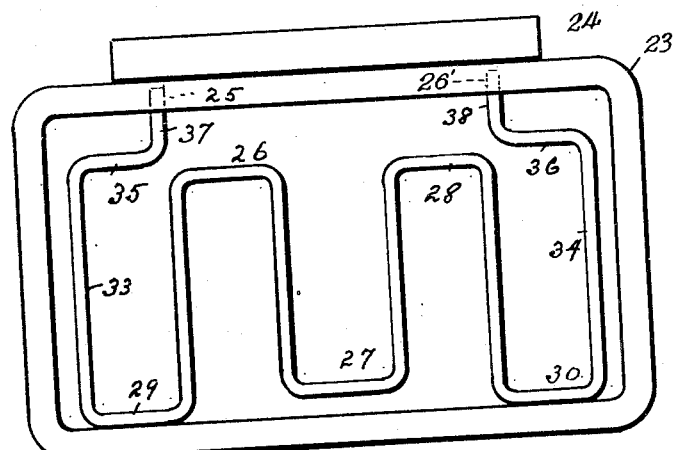
Figure 2 is a like view and defining a rack fabricated for modified impingement with the tray.
Figure 3:
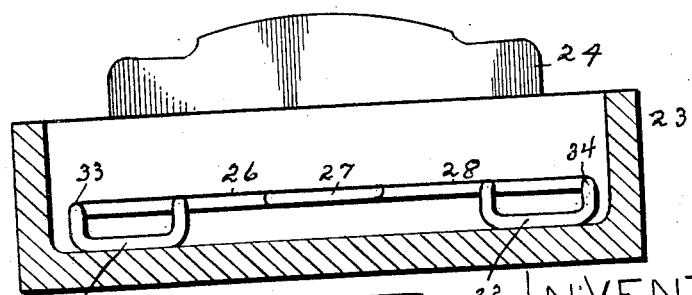
Figure 3 is an elevation view in section of Figure 2.
Figure 4:
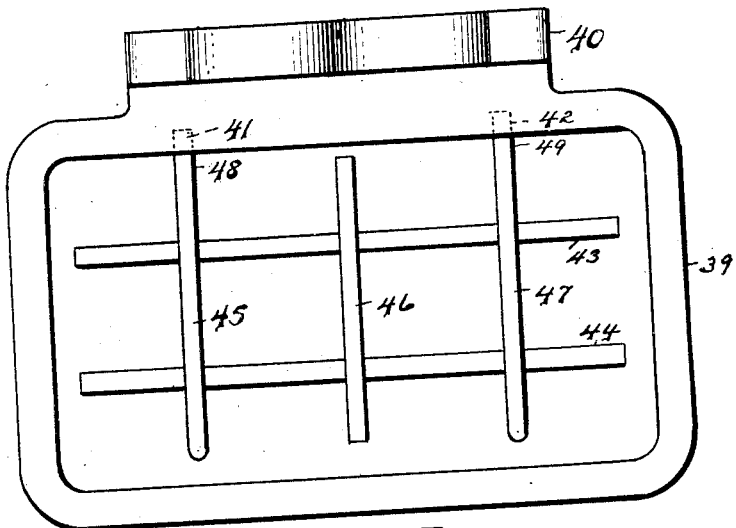
Figure 4 is a plan view of a tray and a composite rack having impingement tines for association with the tray.
Figure 5:
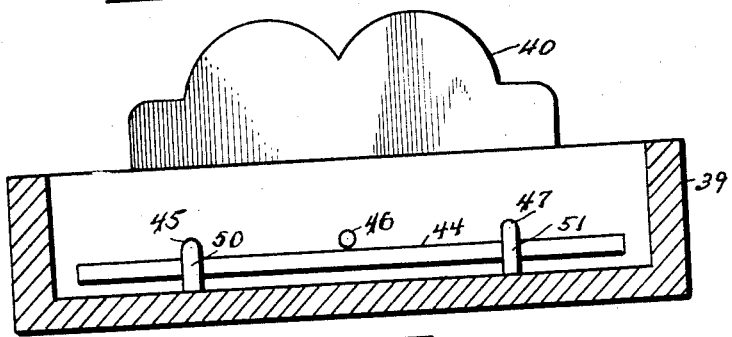
Figure 5 is an elevational sectional view of Figure 4.

By reference to Figures 4 and 5, a tray 39 is provided with a back 40 and into the rear wall of the tray is formed openings 41 and 42 similar to the openings 25 and 26 of Figure 2.

Here a composite rack is formed of elongated bars 43 and 44, with transverse bars 45, 46 and 47 suitably welded to each other, and the bars 45 and 47 are of elongation greater than the bar 46, and these elongated bars terminate in tines 48 and 49 on one side of the elongated bars, and in depending rests 50 and 51 at the opposite ends. In the assembly of this rack through welding, it is designed to slightly offset the bars 45 and 47 so that, with relation to the openings 41 and 42, the axis of the bars and those of the openings will sufficiently disalign to command a flexing of the tines 48 and 49 prior to permitting their entry in the openings 41 and 42, and this will create an impingement of the body of the tines against the wall of the openings, and thus effect a permanency of the rack within the tray to be disturbed only by force.

Figure 6:
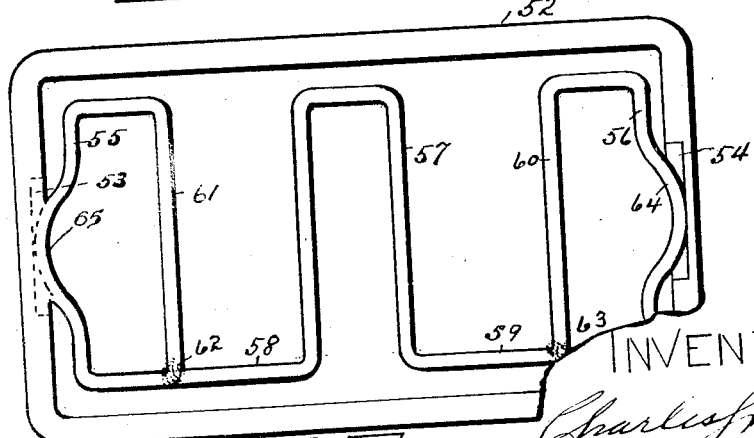
Figure 6 shows a plan view of a tray laterally indented to receive impinging elements of a composite and fabricated tray.

By reference to Figure 6, a desirable modification of the invention, the tray 52 is provided with substantially elongated retainers 53 and 54 either forming into the side walls of the tray or the same may be formed in association therewith to project in opposed directions into the wall of the tray.

A rack is formed of a strip of bendable and flexible material and is constituted of two end eyes 55 and 56, and an intermediate bighted formation 57, linked to the end eyes by lateral bars 58 and 59 to which one of the legs 60 and 61 is welded as at 62 and 63. The framework of the eyes 55 and 56 is deflected at 64 and at 65, and furnish retaining elements having sufficient flexibility to engage and impinge the wall of the recess 53 and 54, in which recesses these retaining elements press by virtue of the inherent resilience and the inherent resistence of the rack. This is possibly the most probable effectual constructive principle for the invention and may be employed in conjunction with any sort of a tray, metallic, ceramic, or rubber.

Reference is now made to Figures 7 and 8 in which the tray structure is of that wall-insertable type which constitutes a head 66 with a wall-thickness offset 67, a base 68 with a wall thickness offset 67 and these formations are connected by a back 69 in the front face of which is positioned opening 70 slightly above the upper face of the base 68, and if desirable, from the front edge of the side walls 71 an integral set of brackets 72 may support a rod 73.

The upper face 74 of the base 68 is provided with vertical opening drilled into the base at right angles to the drilling of the openings 70 for purposes which will appear.

Upon transverse bars 75, 76, 77 and 78 are elongated bars 80, and two of these transverse bars 75 and 78 have tines 81 and 82 which are not only at right angles to each other, but when set in position and welded to the elongated bars 80 are axially out of alignment with the axis of the openings, so that when it is desired to place the rack in position within the cavity of the wall-insertable tray, the flexation of the tines will so provide for impingement against the wall of the openings as to frictionally hold the rack in place.

Finally, with regard to the illustration set forth in Figure 9, a tray of any suitable type may be provided with the usual well 83, base 84 and side and end walls 85 and 86. Within the well 83 of this structure and against the side walls 85 are located a pair of bifurcated lugs 87 having undercut entries 88 the contour whereof is intercepted by a stop 89.

A rack for this structure is adapted to be pivoted in said lugs, and comprises a series of transverse rods 90 and welded elongated rods 91, and one of these transverse rods is sufficiently elongated with respect to the remainder of them to allow the end thereof to form tines adapted to seat in the bight formed in the lugs, and therein retained against accidental removal by the aforesaid stops 89 in juxtaposition with said bights.

Having thus set forth the invention I claim:

1. A composite tray and rack, said tray constituting a structure adapted to be associated with a wall, and having a back provided with equidistantly disposed openings, of a manually flexible rack consisting of interrelated bars, two of which project beyond the length of their companion bars, and in disalignment with the axis of said openings, said extending bars being adapted to be flexed into said openings for frictional engagement with their walls, rests for the flexible bars, and a bar associated with a tray.

2. In a device as set forth, the combination with a tray having a base and walls upstanding therefrom, and having the walls provided with retainers, of a rack bent upon itself to form bifurcated formations and end loops all being manually flexible, tines proceeding from the loops and normally out of alignment with the retainers, and bars proceeding from the bifurcations and from which the end loops may be manually flexed to align the tines for association by impingement with the retainers.

3. In a device as set forth, the combination with a tray having a bottom and upstanding walls, retainers associated with said walls, of a rack bent upon itself so as to permit of manual flexation, and formed of bifurcations, and end loops at the rack corners, tines, proceeding from said loops and normally disposed out of alignment with the retainers, bars proceeding from the bifurcations and relatively out of alignment with the bars and the legs of the bifurcations, and forming depending rests, and from which the end loops may be manually flexed to align the tines for engagement with the retainers.

CHARLES L. RUHL.